(12) United States Patent
Matsuoka et al.

(10) Patent No.: US 7,095,359 B2
(45) Date of Patent: Aug. 22, 2006

(54) METHOD OF OBSERVING SEA ICE

(75) Inventors: Takeshi Matsuoka, Koganei (JP); Seiho Uratsuka, Koganei (JP); Makoto Satake, Koganei (JP); Tatsuharu Kobayashi, Koganei (JP); Akitsugu Nadai, Koganei (JP); Toshihiko Umehara, Koganei (JP); Hideo Maeno, Koganei (JP); Hiroyuki Wakabayashi, Tokyo (JP); Yasushi Fukamachi, Sapporo (JP); Fumihiko Nishio, Chiba (JP)

(73) Assignees: National Institute of Informantion and Communications Technology, Incorporated Administrative Agency, Tokyo (JP); Japan Aerospace Exploration Agency, Tokyo (JP); Agency of Industrial Science and Technology, Saitama (JP)

( * ) Notice: Subject to any disclaimer, the term of this patent is extended or adjusted under 35 U.S.C. 154(b) by 175 days.

(21) Appl. No.: 10/697,293

(22) Filed: Oct. 31, 2003

(65) Prior Publication Data

US 2004/0143395 A1 Jul. 22, 2004

Related U.S. Application Data

(63) Continuation of application No. PCT/JP02/02002, filed on Mar. 4, 2002.

(30) Foreign Application Priority Data

Nov. 7, 2001 (JP) .............................. 2001-342437

(51) Int. Cl.
*G01S 13/95* (2006.01)
*G01S 13/89* (2006.01)
*G01S 13/90* (2006.01)

(52) U.S. Cl. .................... 342/26 R; 342/22; 342/25 R; 342/25 A; 342/25 F; 342/26 B; 342/52; 342/104; 342/118; 342/175; 342/188; 342/195; 367/87; 367/89

(58) Field of Classification Search .... 342/25 R–26 D, 342/27, 28, 41, 52–59, 104, 118, 127–146, 342/175, 188–197, 22; 367/87–116, 59; 324/637–646, 691, 693, 699, 713, 715, 716
See application file for complete search history.

(56) References Cited

U.S. PATENT DOCUMENTS 3,267,416 A * 8/1966 Morse ........................ 367/115

(Continued)

FOREIGN PATENT DOCUMENTS

JP 62-124480 A 6/1987

(Continued)

OTHER PUBLICATIONS

Tsuyoshi Matsuoka et al.: 30th proceedings of the Japanese Conference on Remote Sensing, (May 9, 2001), The Remote Sensing Society of Japan, pp. 253, 254.

(Continued)

*Primary Examiner*—Bernarr E. Gregory
(74) *Attorney, Agent, or Firm*—Birch, Stewart, Kolasch & Birch, LLP

(57) ABSTRACT

An ice thickness/drifting velocity observation of sea ice by using an ice thickness measurement sonar and a current meter moored into the sea and a sea ice observation by a high-resolution airborne SAR are synchronously performed, a correlation between a draft profile of sea ice passing over the sonar and an SAR backscattering coefficient profile is calculated, and an ice draft of desired sea ice is calculated from the relational expression and an SAR backscattering coefficient. As the SAR backscattering coefficient, a backscattering coefficient of L-band HV polarization may be used. A backscattering coefficient of X-band VV polarization is preferably used as the SAR backscattering coefficient to detect thin ice having a thickness of not more than approximately 10 cm.

18 Claims, 9 Drawing Sheets
(2 of 9 Drawing Sheet(s) Filed in Color)

U.S. PATENT DOCUMENTS

| | | | |
|---|---|---|---|
| 3,665,466 A * | 5/1972 | Hibbard | 342/59 |
| 4,075,555 A * | 2/1978 | Wight et al. | 324/644 |
| 4,287,472 A * | 9/1981 | Pan et al. | 324/699 |
| 4,697,254 A * | 9/1987 | Pridham | 367/92 |
| 4,885,591 A * | 12/1989 | Page | 342/41 |
| 4,899,322 A * | 2/1990 | Crutcher et al. | 367/59 |
| 5,264,852 A * | 11/1993 | Marquet | 342/26 R |
| 6,188,348 B1 * | 2/2001 | Raney | 342/22 |

FOREIGN PATENT DOCUMENTS

| | | |
|---|---|---|
| JP | 11-248833 A | 9/1999 |
| WO | WO 96/13733 A1 | 5/1996 |

OTHER PUBLICATIONS

Joji Iizaka et al.: Gosei Kaiko Radar Gazo Handbook, K.K. Asakura Shoten, (May 20, 1998), , pp. 132 to 141.

Wakabayashi H. et al.: Geoscience and Remote Sensing Symposium, 2000. Proceedings IGARSS 2000. IEEE 2000 International, volume, pp. 503 to 505 vol. 2.

Matsuoka T. et al.: Geoscience and Remote Sensing Symposium, 1999. IGARSS'99 Proceedings. IEEE 1999 International volume, pp. 107 to 109 vol. 1.

* cited by examiner

METHOD OF OBSERVING SEA ICE

This application is a Continuation of copending PCT International Application No. PCT/JP02/02002 filed on Mar. 4, 2002, which designated the United States, and on which priority is claimed under 35 U.S.C. § 120, and this application claims priority to Japanese application 2001-342437 filed Nov. 7, 2001 under 35 USC 119, the entire contents of which are hereby incorporated by reference.

TECHNICAL FIELD

The present invention relates to a method of performing a sea ice observation for the thickness of sea ice or the like by using a synthetic aperture radar (SAR).

BACKGROUND ART

Many areas (e.g. the Sea of Okhotsk) in the world have seasonal sea ice zones. The extent of the seasonal sea ice zone and the sea ice volume greatly affect the energy exchange between the atmosphere and the ocean. For this reason, it is an important factor for meteorological observation to detect a seasonal sea ice zone.

In particular, thin ice having a thickness of not more than 30 cm is of critical significance in controlling the heat, salt, and vapor fluxes at the ocean surface. Thus, detecting and classifying the thin ice using remote sensing technology is of particular importance.

Up to now, many researches for a distribution of sea ice thicknesses or classification of ice types are performed by using a microwave radiometer or a synthetic aperture radar.

However, data obtained from these researches are rarely discussed in relation to actually observed values of ice thicknesses except for comparison with observed values of ice thickness obtained by a submarine-borne sonar in the polar zones.

Especially, the Sea of Okhotsk has few actual measurements of ice thicknesses. The actual measurements have been rarely compared with values obtained by a microwave sensor/radar.

Therefore, the present invention has as object to provide a method of observing sea ice for calculating an ice draft of desired sea ice from data obtained by a synthetic aperture radar.

DISCLOSURE OF THE INVENTION

In order to solve the above problem, a method of observing sea ice according to the present invention has the following components.

That is, an ice thickness/drifting velocity observation of sea ice by using an ice thickness measurement sonar and a current meter moored into the sea and a sea ice observation by a high-resolution airborne SAR are synchronously performed to calculate a correlation between a draft profile of sea ice passing over the sonar and an SAR backscattering coefficient profile. The method of observing sea ice is characterized in that an ice draft of desired sea ice is calculated from the relational expression and an SAR backscattering coefficient.

In this case, as the SAR backscattering coefficient, a backscattering coefficient of L-band HV polarization may be used.

A backscattering coefficient of X-band VV polarization is preferably used as the SAR backscattering coefficient to detect thin ice having a thickness of not more than approximately 10 cm.

A ratio of a backscattering coefficient of X-band VV polarization to a backscattering coefficient of X-band HH polarization may be used.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

BRIEF DESCRIPTION OF DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

An embodiment of the present invention will be described below with reference to the drawings.

In this embodiment, a relational expression between actual measurements of ice thicknesses obtained by a sonar and data obtained by an SAR is obtained from observations performed on the Okhotsk coast of Hokkaido. However, the method according to the present invention can be applied to an arbitrary sea ice observation in another region. Although the SAR is borne on an airplane, the SAR can be properly borne on a flying object such as an artificial satellite or flying balloon.

Figure 9:
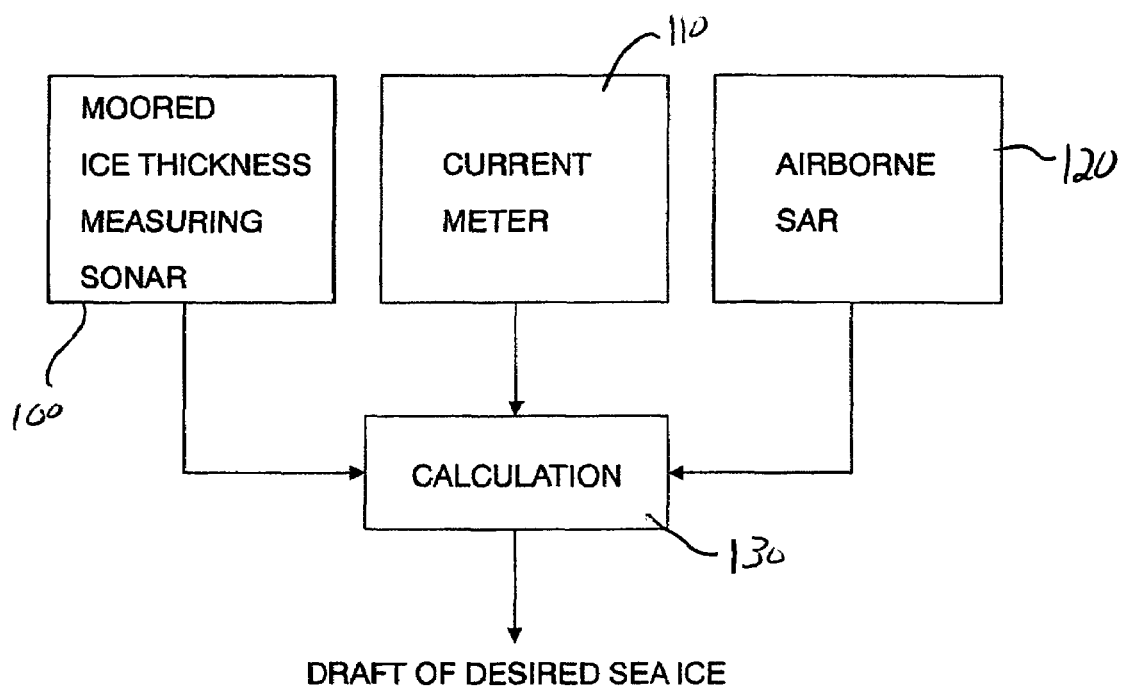
FIG. 9 illustrates an exemplary system for observing draft of a desired sea ice.

The present inventor performed an ice thickness/drifting velocity observation as shown in FIG. 9 by using an ice thickness measuring sonar (IPS: Ice Profiling Sonar) 100 moored into the sea and a current meter 110 (ADCP: Acoustic Doppler Current Profiler). In sync with this IPS/ADCP sea ice observation, a sea ice observation was performed by a high-resolution airborne SAR (Pi-SAR) 120. A correlation 130 between an ice draft profile of sea ice that is actual measurements of ice thicknesses of sea ice passing over an IPS and an SAR backscattering coefficient profile will be described below.

The SAR observation was performed twice at a 20 hours interval on the Okhotsk coast.

During the two observations, the weather conditions were relatively calm, i.e., the average wind speed was 3.5 m/s and the air temperature ranged from −12 to 0° C., and the sea ice mainly moved from the east-southeast to the east.

Figure 1:
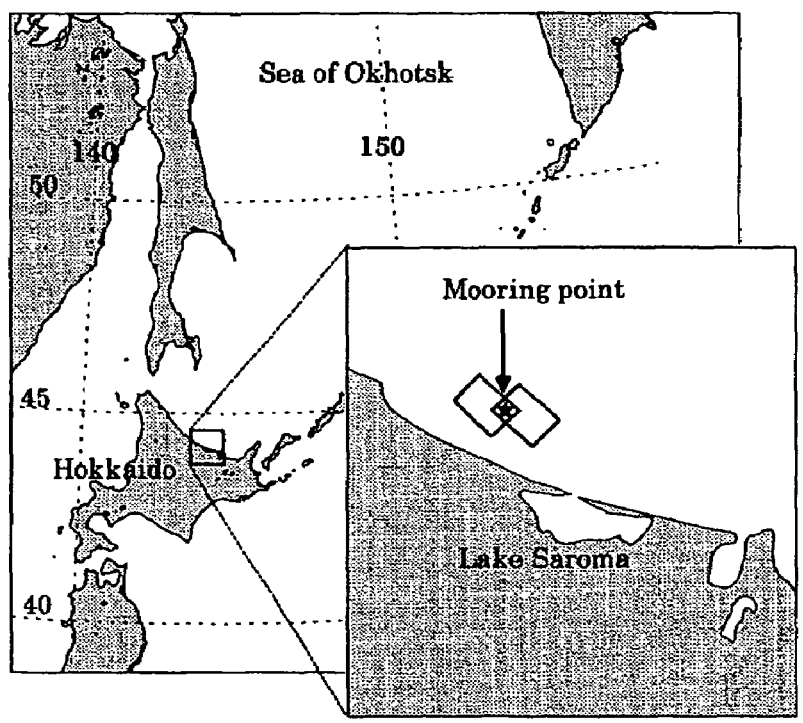
FIG. 1 is a map showing an observation area.
Figure 2:
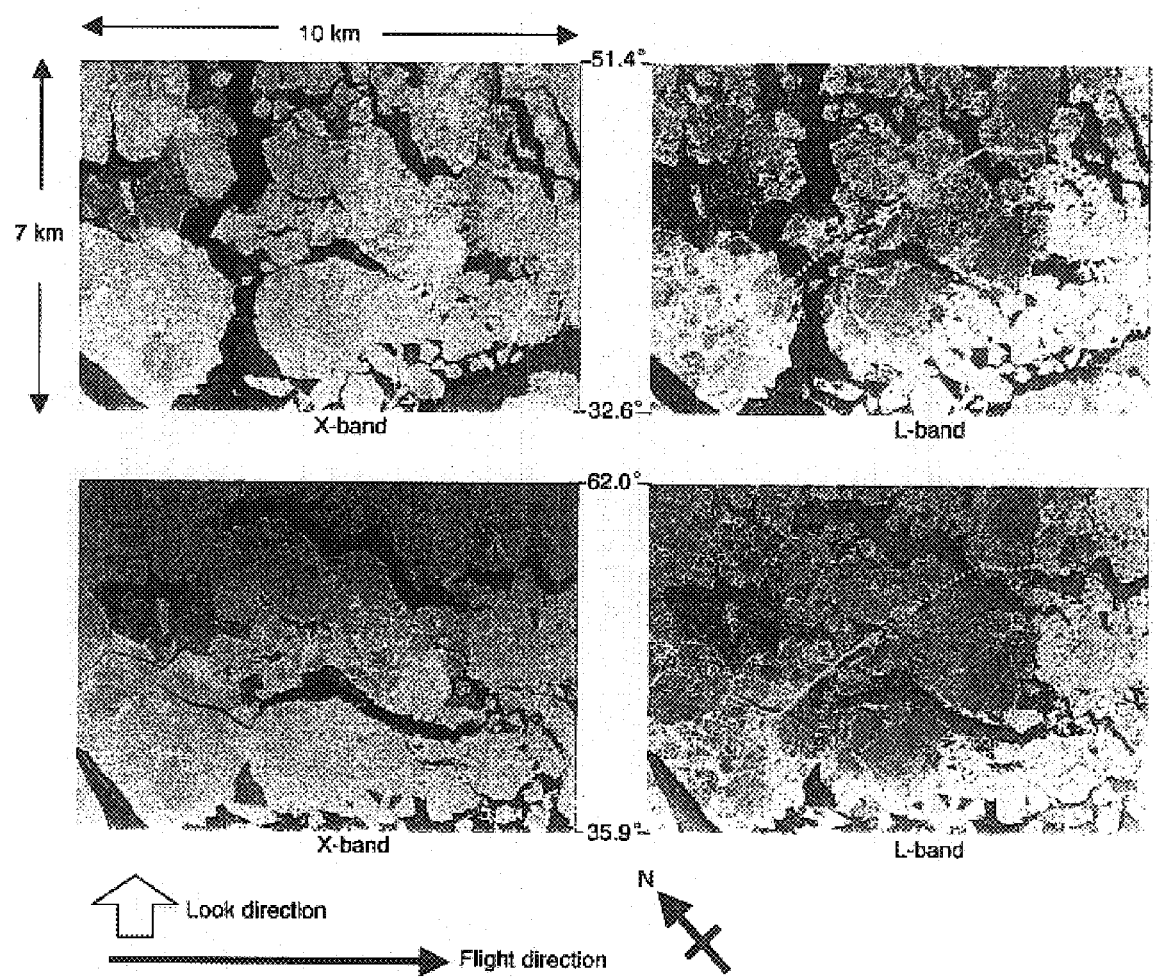
FIG. 2 shows L-band and X-band polarization synthetic photographs of sea ice obtained by two SAR observations.

An observation area is shown in the map in FIG. 1. L-band and X-band polarization synthetic photographs obtained by the two SAR observations are shown in FIG. 2 (HH polarized wave is indicated in red, VV polarized wave is indicated in green, and HV polarized wave is indicated in blue). In FIG. 2, upper left and right photographs respectively show an X-band polarization image and an L-band polarization image at the same point, and lower left and right photographs respectively show an X-band polarization image and an L-band polarization image at the same point different from the above point. A line described in the L-band polarization image is a track of sea ice passing over an IPS obtained from an ADCP, and an upper right end point of a line in the upper L-band polarization image and a lower left end point of a line in the lower L-band polarization image are positions of the moored IPS.

A moving distance of sea ice was approximately 7.6 km, and an average ice velocity was 10 cm/s.

Figure 3:
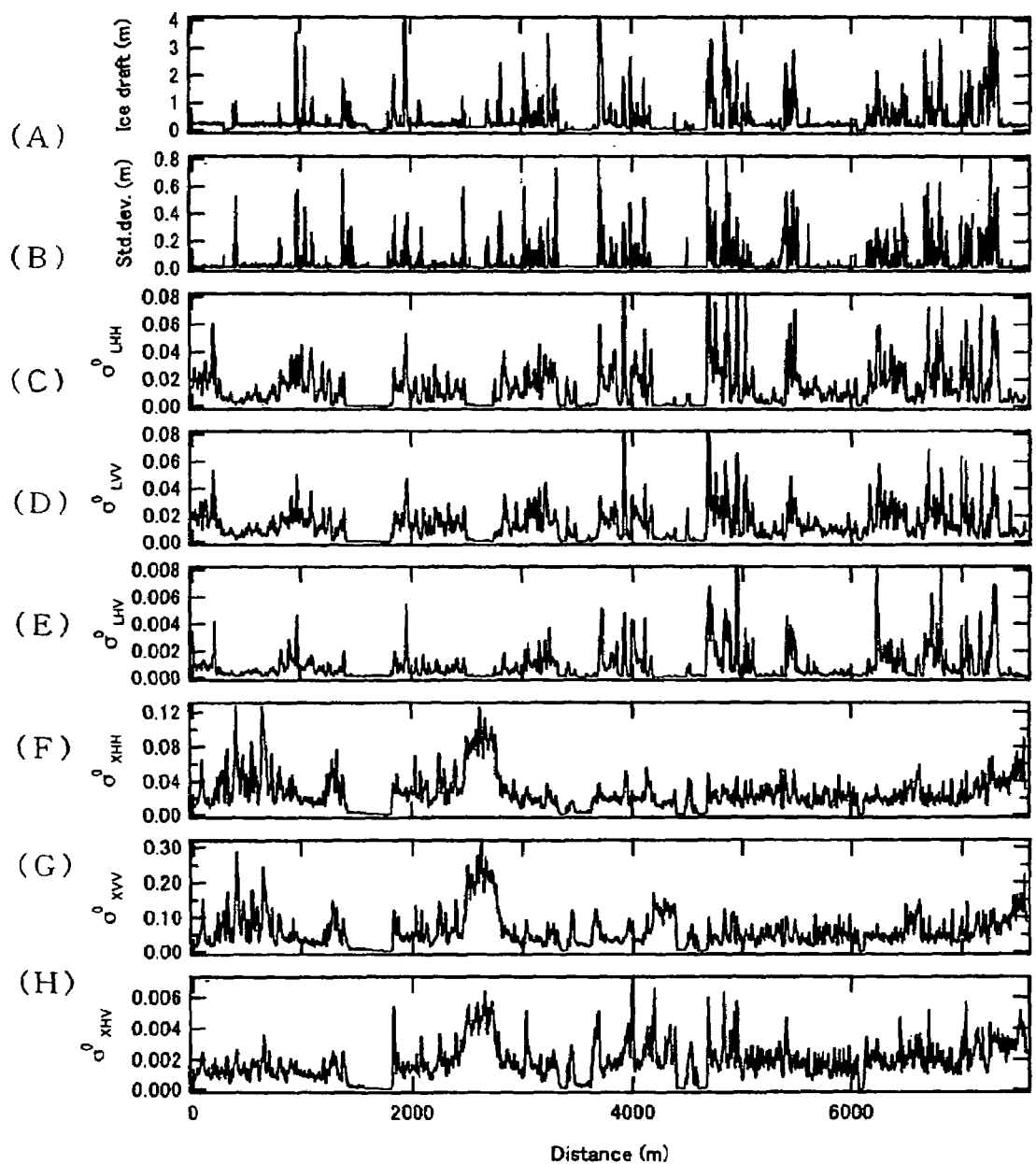
FIG. 3(A) shows a draft profile along a sea ice track.
FIG. 3(B) shows a standard deviation profile of the ice draft.
FIG. 3(C) shows a backscattering coefficient profile of L-band HH polarization.
FIG. 3(D) shows a backscattering coefficient profile of L-band VV polarization.
FIG. 3(E) shows a backscattering coefficient profile of L-band HV polarization.
FIG. 3(F) shows a backscattering coefficient profile of X-band HH polarization.
FIG. 3(G) shows a backscattering coefficient profile of X-band VV polarization.
FIG. 3(H) shows a backscattering coefficient profile of X-band HV polarization.

FIG. 3(A) shows an ice draft profile along a track of sea ice.

An average ice draft was 0.49 m, and the maximum value was 4.77 m.

FIG. 3(B) shows a standard deviation profile of ice drafts obtained at five neighboring points at 0.5-m intervals.

As shown in FIG. 3(B), the standard deviation profile of ice drafts well coincides with the ice draft profile.

It was understood that large values of ice drafts and standard deviations (over 1 m) were often observed at the rim of ice floes. For this reason, it was supposed that very thick ice having a thickness of not less than approximately 1 m was formed by rafting and ridging at the rims of the ice.

FIGS. 3(C), 3(D), 3(E), 3(F), 3(G), and 3(H) show backscattering coefficient profiles (antilog) of L-band HH polarization, L-band VV polarization, L-band HV polarization, X-band HH polarization, X-band VV polarization, and X-band HV polarization, respectively.

The correlation between the ice draft profile and the backscattering coefficient profile of the L-band HV polarization was better than the correlations between the ice draft profile and the backscattering coefficient profiles of the other band polarizations, and the correlation coefficient was 0.64.

The backscattering of the cross-polarization (HV) is mainly caused by multiple scattering and volume scattering and is not related directly to the ice thickness. This suggests that the surface roughness formed by collision of the rims of ice causes the large backscattering.

As is apparent from FIG. 3(G), the backscattering coefficient profile of X-band VV polarization is rarely related to the ice draft profile. However, the backscattering coefficient profile of X-band VV polarization is characterized in that extremely backscattering can be obtained by very thin ice (not more than approximately 10 cm) (for example, at a 2500 m point or a 4200 m point).

Figure 4:
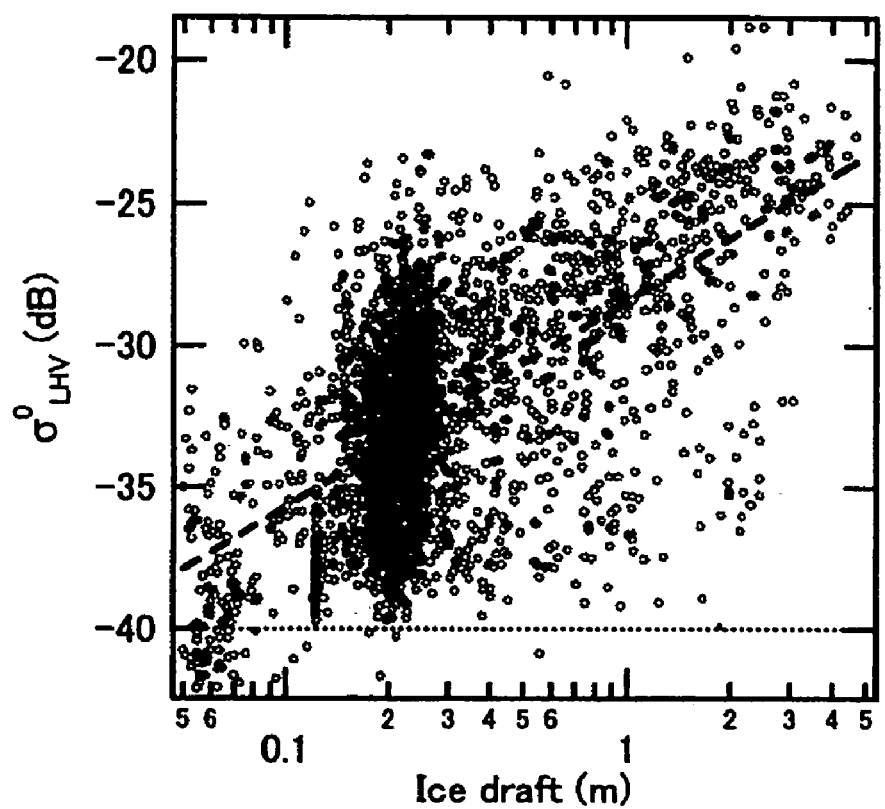
FIG. 4 is a graph showing a correlation between an ice draft and a backscattering coefficient of L-band HV polarization.
Figure 5:
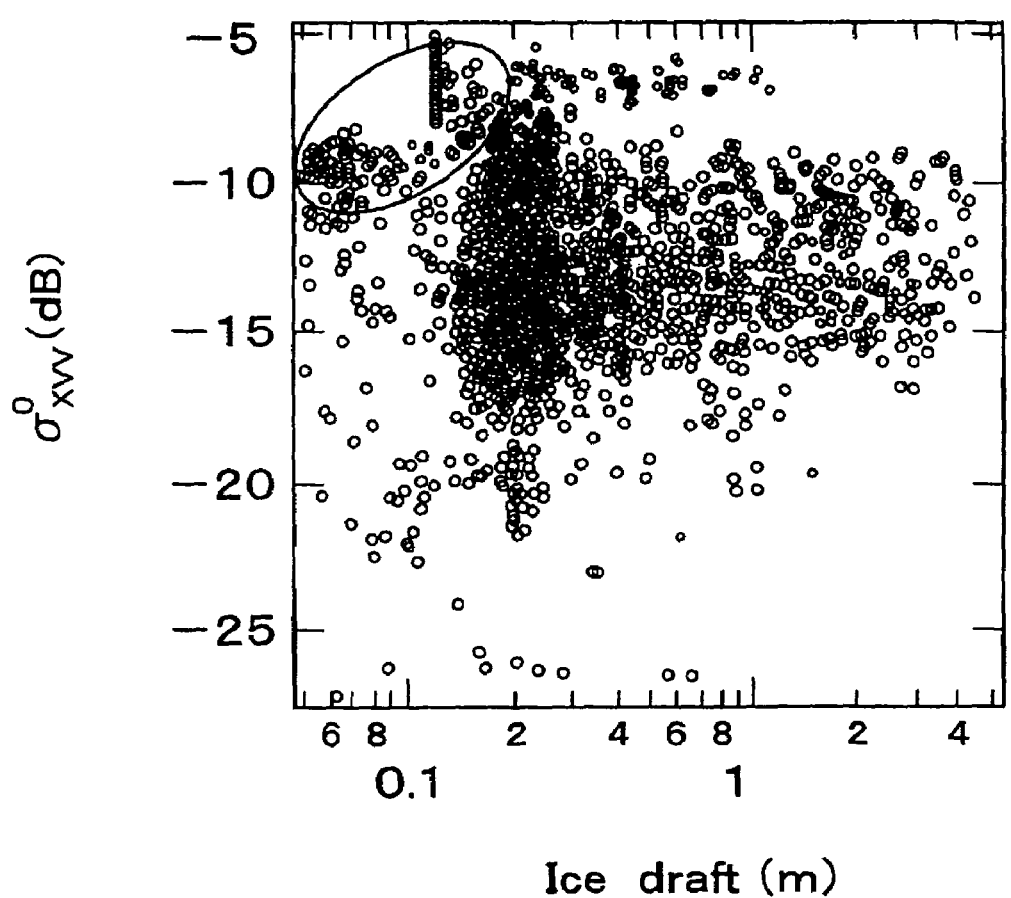
FIG. 5 is a graph showing a correlation between an ice draft and a backscattering coefficient of X-band VV polarization.

FIGS. 4 and 5 are graphs showing correlations between an ice draft (log) and backscattering coefficients (dB) of L-band HV polarization and X-band VV polarization. A regression line is calculated from FIG. 4 as follows:

$$\sigma = 7.3 \log (d) - 28.4 \text{ dB}$$

(where d is the ice draft).

It is considered that the dispersion of the backscattering values from the regression line is mainly caused by small differences in the observation points of the IPS and the SAR.

Figure 6:
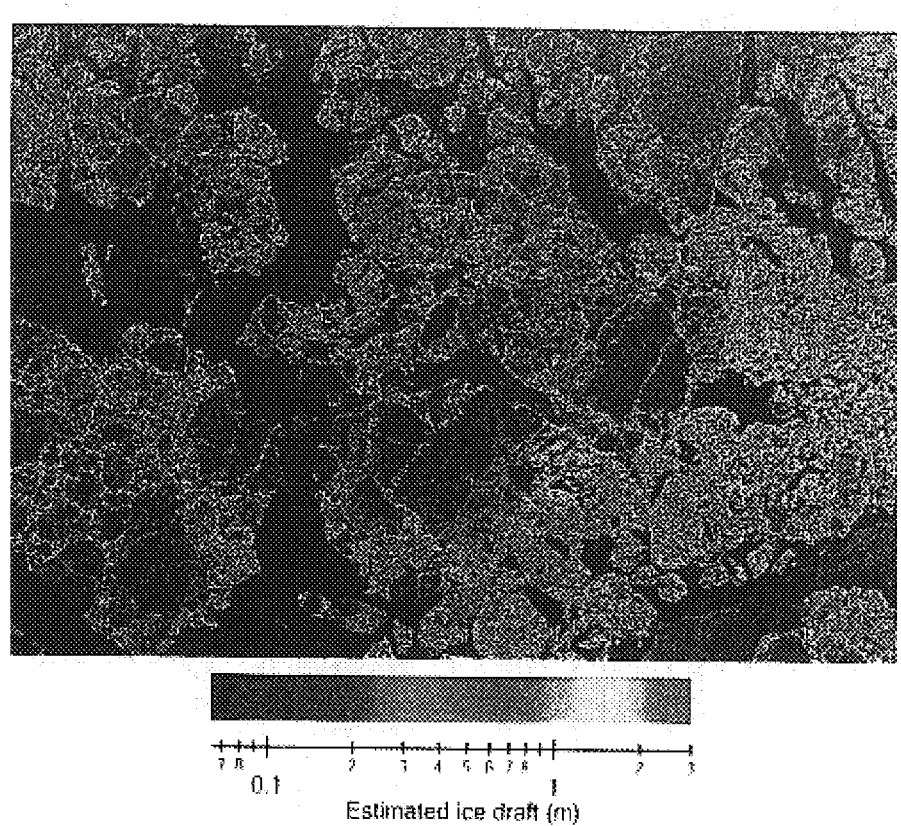
FIG. 6 is a photograph showing an image obtained when a backscattering coefficient of an L-band HH polarization SAR image is converted into an ice draft.

An image obtained by converting the backscattering coefficient of an SAR image in an L-band HH polarization image shown in the lower right in FIG. 2 into an ice draft by the above equation is shown in FIG. 6.

According to FIG. 6, it can be confirmed that an ice thickness is large at the rim of ice. An area having an ice thickness of not less than 1 m is approximately 15% of the entire area of the ice. The volume in the area corresponds to ⅓ of the entire volume.

On the other hand, according to FIG. 5, the following characteristics were understood. That is, a backscattering coefficient profile of X-band VV polarization increases in thin ice, and a polarization ratio (VV/HH) increases. For this reason, ice type classification for SAR images was performed by using X-band HH and VV polarizations. The classification was performed on the basis of definition of WMO on the three stages, i.e., open water, thin ice (Nilas and Gray ice each having a thickness of not more than 15 cm), and thick ice (gray-white ice having a thickness of not more than 15 cm and first-year ice).

Figure 7:
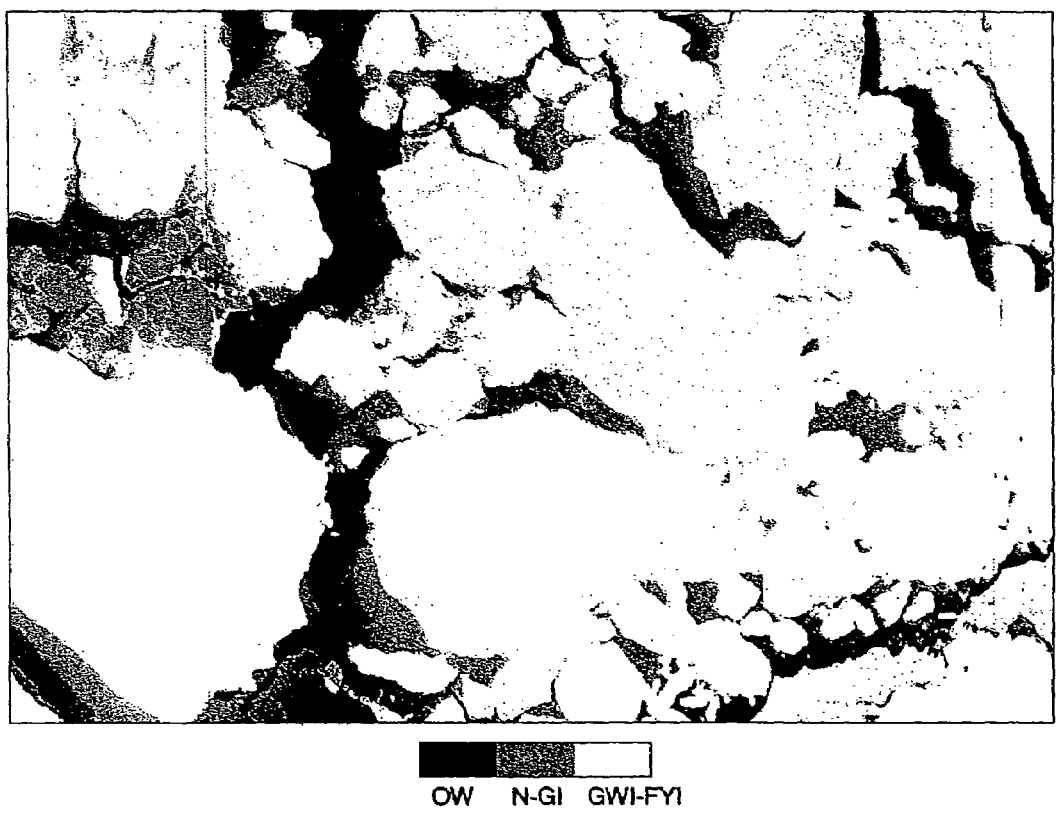
FIG. 7 is a diagram showing a classification result of sea ice obtained in the three stages of open water, thin ice, and thick ice.
Figure 8:
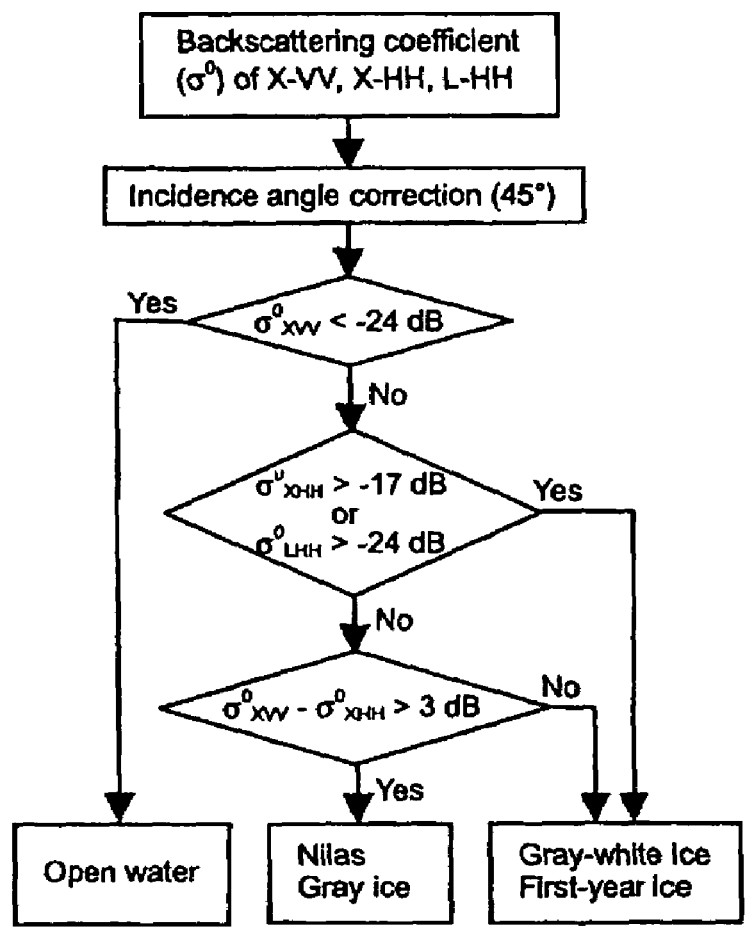
FIG. 8 is a flow chart showing a method of classifying open water, thin ice, and thick ice.

FIG. 7 is a diagram showing the classification results. FIG. 8 is a flow chart showing a method of classifying open water, thin ice, and thick ice.

According to FIG. 7, it could be confirmed that the thin ice made up approximately 8% and extended between the rim of the one-year ice and the open water.

INDUSTRIAL APPLICABILITY

The method of observing sea ice according to the present invention has the above configuration to achieve the following advantages.

That is, an ice thickness/drifting velocity observation of sea ice by using a moored ice thickness measurement sonar and a current meter and a sea ice observation by an SAR are synchronously performed, actual measurements of ice thicknesses by the sonar can collate with data obtained by the SAR, and a correlation between a draft profile of sea ice passing over the sonar and an SAR backscattering coefficient profile can be calculated. An ice draft of desired sea ice can be calculated from the relational expression and an SAR backscattering coefficient.

In particular, when a backscattering coefficient of L-band HV polarization having a high correlation coefficient is used as the SAR backscattering coefficient profile, sea ice observation can be easily performed at high accuracy. A backscattering coefficient of X-band VV polarization which can obtain extremely large backscattering in thin ice is used as the SAR backscattering coefficient to effectively detect thin ice having a thickness of not more than approximately 10 cm. Since the backscattering coefficient of X-band VV polarization is rarely related to the ice draft, thin ice having a thickness of not more than approximately 10 cm can be detected by using a ratio of the backscattering coefficient of X-band VV polarization to a backscattering coefficient of X-band HH polarization.

The invention claimed is:

1. A method for observing ice draft of desired sea ice comprising:
    a) measuring ice draft and drift velocity of sea ice passing over a moored ice thickness measurement sonar to make an ice draft profile, and synchronously measuring an SAR backscattering coefficient of said sea ice passing over the moored ice thickness measurement sonar to make an SAR backscattering coefficient profile;
    b) calculating a relational formula between said ice draft profile and said SAR backscattering coefficient profile;
    c) calculating the ice draft of the desired sea ice from said relational formula and an SAR backscattering coefficient of said desired sea ice.

2. The method according to claim 1, wherein the SAR backscattering coefficient is a backscattering coefficient of L-band HV polarization measured using SAR.

3. The method according to claim 1, further comprising: measuring a backscattering coefficient of X-band VV polarization to detect sea ice thinner than approximately 10 cm.

4. The method according to claim 1, further comprising: observing a ratio of a backscattering coefficient of X-band VV polarization to a backscattering coefficient of X-band HH polarization to detect sea ice thinner than approximately 10 cm.

5. A computer program in a computer readable medium for observing ice draft of desired sea ice comprising:
    a) calculating a relational formula between an ice draft profile of sea ice and an SAR backscattering coefficient profile of said sea ice from ice draft data of said sea ice, drift velocity data of said sea ice and SAR backscattering coefficient profile data; and
    b) calculating the ice draft of the desired sea ice from said relational formula and an SAR backscattering coefficient of said desired sea ice.

6. The computer program according to claim 5, wherein the SAR backscattering coefficient is a backscattering coefficient of L-band HV polarization measured using SAR.

7. The computer program according to claim 5, further comprising:
    recognizing a target as open water when a backscattering coefficient of X-band VV polarization of the target is not more than a predetermined value,
    recognizing the target as thin ice or thick ice when the backscattering coefficient of X-band VV polarization of the target is not less than a predetermined value, and
    recognizing the target as thick ice when a backscattering coefficient of X-band HH polarization of the target is not less than a predetermined value or a backscattering coefficient of L-band HH polarization of the target is not less than a predetermined value.

8. The computer program according to claim 7, further comprising:
    recognizing the target as thin ice when the backscattering coefficient of X-band VV polarization of the target is larger than the backscattering coefficient of X-band HH polarization of the target by a predetermined value.

9. A recording medium readable by a computer having stored thereon a computer program for observing ice draft of desired sea ice, comprising:
    a) calculating a relational formula between an ice draft profile of sea ice and an SAR backscattering coefficient profile of said sea ice from ice draft data of said sea ice, drift velocity data of said sea ice and SAR backscattering coefficient profile data; and
    b) calculating the ice draft of the desired sea ice from said relational formula and an SAR backscattering coefficient of said desired sea ice.

10. The recording medium according to claim 9, wherein the SAR backscattering coefficient is a backscattering coefficient of L-band HV polarization measured using SAR.

11. The recording medium according to claim 9, wherein the computer program further comprising:
    recognizing a target as open water when a backscattering coefficient of X-band VV polarization of a target is not more than a predetermined value,
    recognizing the target as thin ice or thick ice when the backscattering coefficient of X-band VV polarization of the target is not less than a predetermined value, and
    recognizing the target as thick ice when a backscattering coefficient of X-band HH polarization of the target is not less than a predetermined value or when a backscattering coefficient of L-band HH polarization of the target is not less than a predetermined value.

12. The recording medium according to claim 11, wherein the computer program further comprising:
    recognizing the target as thin ice when the backscattering coefficient of X-band VV polarization is larger than the backscattering coefficient of X-band HH polarization by a predetermined value.

13. A system for observing ice draft of desired sea ice comprising:
    a moored ice thickness measuring sonar moored into the sea for measuring thickness of ice draft of the sea ice drifting above said moored ice thickness measuring sonar continuously to make a draft profile of said sea ice;
    a current meter moored into the sea for measuring velocity and direction of said sea ice drifting above said moored ice thickness measuring sonar continuously to make the draft profile of said sea ice; and
    an airborne SAR which observes around said sea ice to obtain SAR backscattering coefficients, synchronized with measurement of said moored ice thickness measuring sonar and said current meter, in order to make an SAR backscattering coefficient profile of said sea ice drifting above said moored ice thickness measuring sonar using said obtained SAR backscattering coefficients, deduce a relational expression between said draft profile of said sea ice and said SAR backscattering coefficient profile of said sea ice; and calculate ice draft of the desired sea ice from said relational expression and the SAR backscattering coefficient of desired sea ice.

14. The system according to claim 13, wherein said moored ice thickness measuring sonar is an ice profiling sonar.

15. The system according to claim 13, wherein said current meter is an acoustic Doppler current profiler.

16. The system according to claim 13, wherein said airborne SAR is configured to obtain backscattering coefficient data.

17. The system according to claim 13, further comprising a calculating device.

18. The system according to claim 17, wherein said calculating device is configured to calculate relational formula between an ice draft profile and an SAR backscattering coefficient profile, and said calculating device is further configured to calculate ice draft of the desired sea ice from said relational formula and an SAR backscattering coefficient of said desired sea ice.

* * * * *

UNITED STATES PATENT AND TRADEMARK OFFICE
CERTIFICATE OF CORRECTION

| | | |
|---|---|---|
| PATENT NO. | : 7,095,359 B2 | Page 1 of 1 |
| APPLICATION NO. | : 10/697293 | |
| DATED | : August 22, 2006 | |
| INVENTOR(S) | : Takeshi Matsuoka et al. | |

It is certified that error appears in the above-identified patent and that said Letters Patent is hereby corrected as shown below:

<u>Item 73</u>
Reads "National Institute of Informantion and Communications Technology, Incorporated Administrative Agency" should read --National Institute of Information and Communications Technology, Incorporated Administrative Agency --

Reads " Agency of Industrial Science and Technology " should read -- Japan Science and Technology Agency--

Signed and Sealed this

Fifteenth Day of May, 2007

JON W. DUDAS
*Director of the United States Patent and Trademark Office*